United States Patent [19]
Krein et al.

[11] Patent Number: 5,590,130
[45] Date of Patent: Dec. 31, 1996

[54] BUS PROTOCOL USING SEPARATE CLOCKS FOR ARBITRATION AND DATA TRANSFER

[75] Inventors: William T. Krein, San Jose; Charles M. Flaig, Cupertino; James D. Kelly, Aptos, all of Calif.

[73] Assignee: Apple Computer, Inc., Cupertino, Calif.

[21] Appl. No.: 510,557

[22] Filed: Aug. 2, 1995

Related U.S. Application Data

[63] Continuation of Ser. No. 186,380, Jan. 25, 1994, abandoned.
[51] Int. Cl.[6] .............................................. H04L 12/417
[52] U.S. Cl. ............................................................. 370/462
[58] Field of Search .......................... 370/41, 85.2, 85.7, 370/85.8, 85.9, 85.11, 94.1; 395/325; 340/825.08

[56] References Cited

U.S. PATENT DOCUMENTS

| | | | |
|---|---|---|---|
| 4,038,644 | 7/1977 | Duke et al. | 364/900 |
| 5,237,696 | 8/1993 | Best | 370/85.2 |
| 5,293,495 | 3/1994 | Nguyen et al. | 395/325 |
| 5,303,391 | 4/1994 | Simcoe et al. | 395/325 |
| 5,309,561 | 5/1994 | Overhouse et al. | 395/325 |

FOREIGN PATENT DOCUMENTS

| | | | |
|---|---|---|---|
| 0474442A2 | 3/1992 | European Pat. Off. | G06F 13/30 |
| 0579389A1 | 1/1994 | European Pat. Off. | G06F 13/42 |
| 2278259 | 11/1994 | United Kingdom | H04L 12/40 |

*Primary Examiner*—Benedict V. Safourek
*Attorney, Agent, or Firm*—Leo V. Novakoski; Fenwick & West LLP

[57] ABSTRACT

A bus system uses separate clocks for arbitration and data transfer. The arbitration clock signal is used for synchronizing bus request and grant events, and the data clock signal is used for synchronizing data transmission and reception. In particular, the data clock signal, which is generated by a bus master node without any temporal relationship to the arbitration clock signal, is transmitted by the bus master node through the bus to a slave node, where the received data signal is synchronized with the data clock signal transmitted therewith.

13 Claims, 10 Drawing Sheets

| Tp | | 9ns | MIN. |
| --- | --- | --- | --- |
| | | 50MHz | MAX. |
| BOARD SKEW | | 2.0ns | MAX. |
| SOURCE (WITH SKEW) | Tsu | 7.0ns | MIN. |
| | Th | 2.0ns | MIN. |
| DESTINATION (WITH SKEW) | Tsu | 5.0ns | MIN. |
| | Th | 0.0ns | MIN. |

| Tp | | 9ns 50MHz | MIN. MAX. |
|---|---|---|---|
| DBAv | Tsu Th | 4.0ns 0.0ns | MIN. MIN. |
| (Resp)Req | Tsu Th | 4.0ns 0.0ns | MIN. MIN. |
| SlotID (to Req) | Tsu | 0.0ns | MIN. |
| SlotID (to Go) | Th | 0.0ns | MIN. |
| Go | Tsu Th | 5.0ns 2.0ns | MIN. MIN. |
| DestSel | Tsu Th | 5.0ns 2.0ns | MIN. MIN. |

FIG. 15

BUS PROTOCOL USING SEPARATE CLOCKS FOR ARBITRATION AND DATA TRANSFER

RELATED APPLICATIONS

This is a continuation of application Ser. No. 08/186,380 filed on Jan. 25, 1994, abandoned.

BACKGROUND OF THE INVENTION

1. Field of the Invention

The invention relates to electronic signal communication, particularly to signaling protocol and related circuitry for enabling data communication through bus lines.

2. Description of Background Art

The use of an assembly of electrical conductors known as a "bus" is common in electrical circuit design. For example, buses are used often in microprocessor-based designs for connecting signal lines between the microprocessor and other system components, such as memory devices, input/output interface and other controller circuitry, each component being coupled typically to a common bus.

Using a shared approach, bus signal lines are thus used, when available, by various components in the system. To avoid bus contention, which arises when components access simultaneously the same signal lines, bus arbitration means are provided typically for granting, according to some specified access criteria, signal lines to certain components requesting access to the bus.

In addition to granting priority to access signal lines, conventional bus arbiters serve to synchronize data signal transfer as well as arbitration signal "hand-shaking" events which occur between the bus arbiter and source and destination components coupled to the bus. In particular, conventional bus arbiters provide a single arbitration clock signal from which system components may synchronize for both arbitration and data transfer purposes.

However, because the rate at which the source or destination components typically transmit or receive data signal to or from the bus does not necessarily match (and, in fact, may often be quite faster than) the arbitration clock rate, overall bus bandwidth using conventional bus synchronization schemes is thereby limited significantly.

Moreover, because bus control is maintained continuously during the entire arbitration process, i.e., by a bus master, not only between bus request and grant events, but also until data transfer is confirmed, valuable bus bandwidth is wasted further during conventional bus arbitration.

Therefore, there is a need to provide a more efficient bus communication protocol whereby overall bandwidth is significantly improved.

SUMMARY OF THE INVENTION

The invention resides in a bus arbitration system having a bus, multiple nodes connected to the bus, and a bus arbiter coupled thereto, wherein an arbitration clock and a data clock are used separately therein. In particular, the arbitration clock signal is used synchronously with arbitration events such as bus requests and grants, and the data clock signal is used synchronously with data packet transmission and reception.

Additionally, the data clock signal, which is generated by a bus master node, without any necessary temporal or logical relationship to the arbitration clock signal, is transmitted by the bus master node through the bus to a slave node coupled thereto, such that a data packet received from the bus master node is inherently synchronous to the data clock signal transmitted therewith.

Furthermore, according to the bus arbitration protocol, bus access may be granted by the bus arbiter to the bus master node in response to the bus master node generating a signal identifying the slave node and the slave node generating a signal indicating its availability for receiving the data signal at a specified data rate and size.

DETAILED DESCRIPTION OF THE PREFERRED EMBODIMENTS

Figure 1:
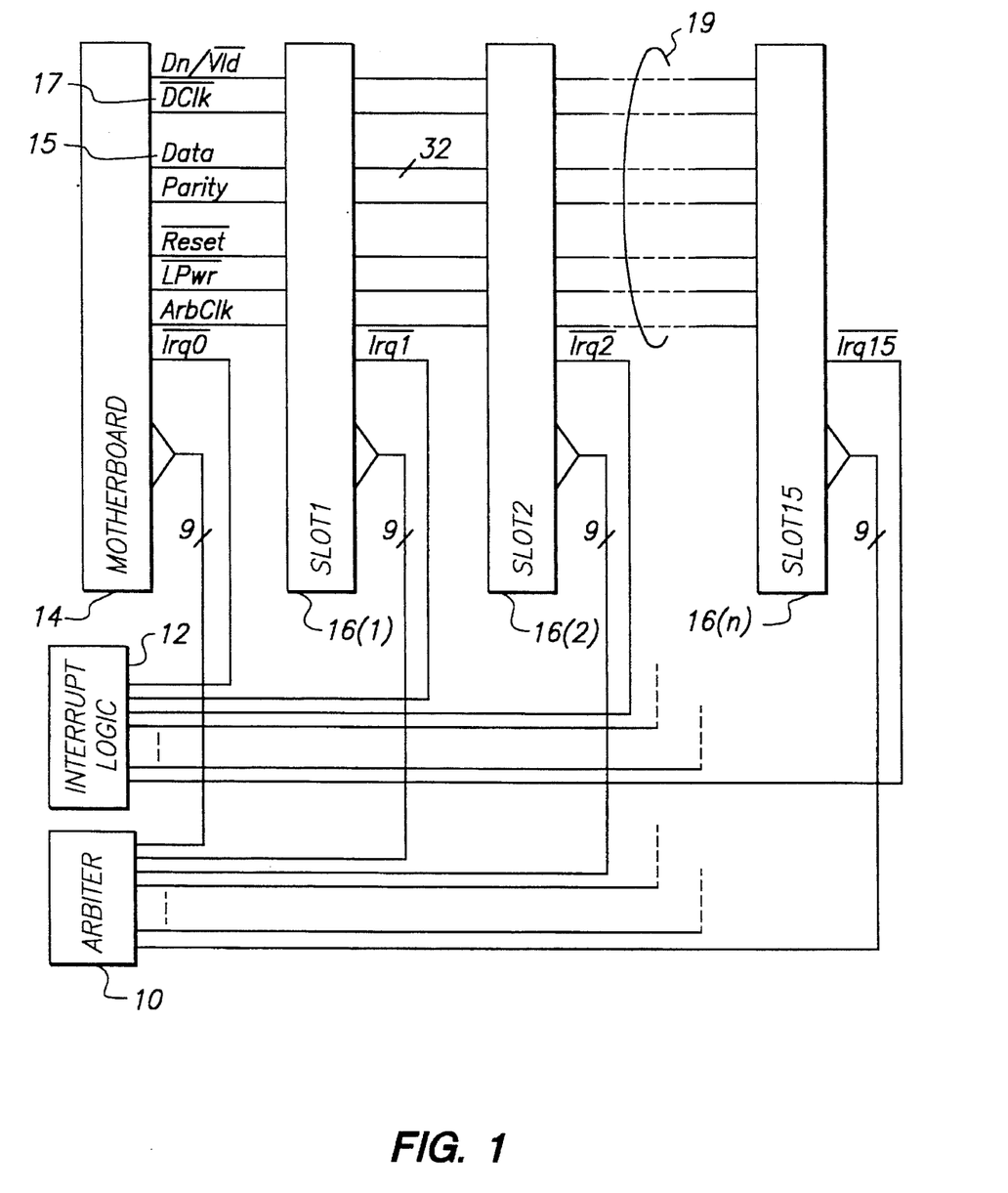
FIG. 1 is a generalized block diagram of an electronic system interconnected for bus communication according to the present invention.

As shown in FIG. 1, the present invention is embodied preferably in a generic interface for electrically and physically coupling removable expansion boards, devices mounted thereon, their corresponding interface slots, or "nodes" 16(1–n) to system or motherboard 14 through common signal lines or "bus" 19 of a conventional digital computer system. It is contemplated, however, that the present invention applies as well to provide efficient bus arbitration in any digital system wherein data communication through bus 19 is provided between multiple nodes 14, 16(1–n) coupled thereto.

Additionally as shown, the inventive system includes multiple nodes 14, 16(1–n), each coupled to bus 19, interrupt logic (optional) 12 having interrupt signal lines (Irq), and arbiter circuit 10. In accordance with the present invention, arbiter circuit 10, which may be a conventional bus controller, performs bus arbitration or signal switching between such nodes 14, 16(1–n) to grant access to signal lines included therein, particularly according to an arbitration clock signal (ArbClk), preferably generated by the system, and applied to all nodes 14, 16(1–n), as described herein.

Furthermore, in accordance with the present invention, upon performance of such bus arbitration, data packets or signals 15 may be transferred between nodes 14, 16(1–n) (i.e., to enable data communication from a source node or bus "master" to a destination node or bus "slave") through bus 19, particularly according to data clock signal (DClk) 17 generated by the master node independently and separately from the arbitration clock signal. In this way, data packets are bursted through the bus without being hampered by various synchronization events.

Figure 2:
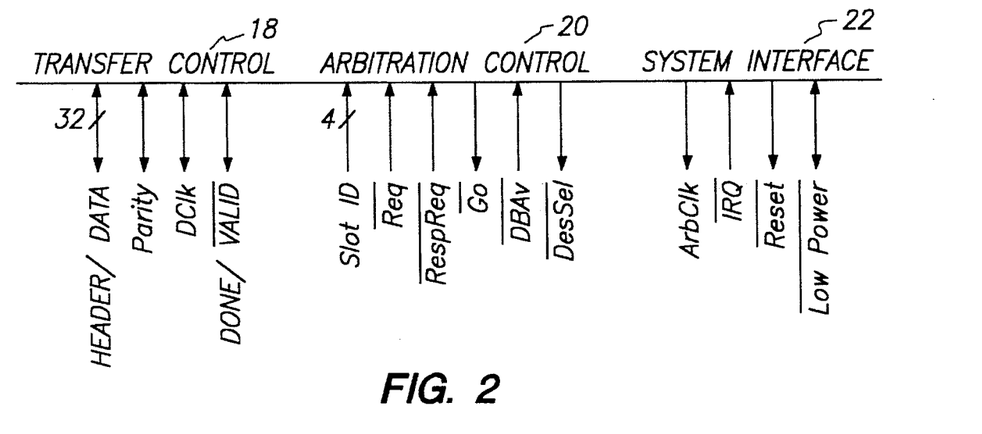
FIG. 2 is a diagram showing signals used in the system of FIG. 1.

FIG. 2 provides a signal list used in a 48-signal line slot interface used in the preferred embodiment, which includes transfer control signals 18, arbitration control signals 20, and system interface signals 22. Transfer control signals 18, which are used for transactions or moving data and are synchronous to DClk 17, are provided with DClk 17 by the bus master. Transfer control signals 18 include 32-bit Header/Data 15, Parity, DClk 17, and Done/Valid signals and are sampled and asserted at each edge of DClk 17.

Arbitration control signals 20 are used for requesting and granting bus ownership, are synchronous or made synchronous to ArbClk and sampled and asserted at the rising edge of ArbClk. Arbitration control signals 20 include 4-bit slot identification (SlotID), request (Req), response request (RespReq), grant ownership (Go), destination buffer available (DBAv) and destination select (DesSel) signals.

System interface signals 22, which may be asynchronous to the entire system or synchronous with ArbClk, provide basic system functions, such as ArbClk, interrupt request (IRQ), reset and low power mode.

Figure 3:
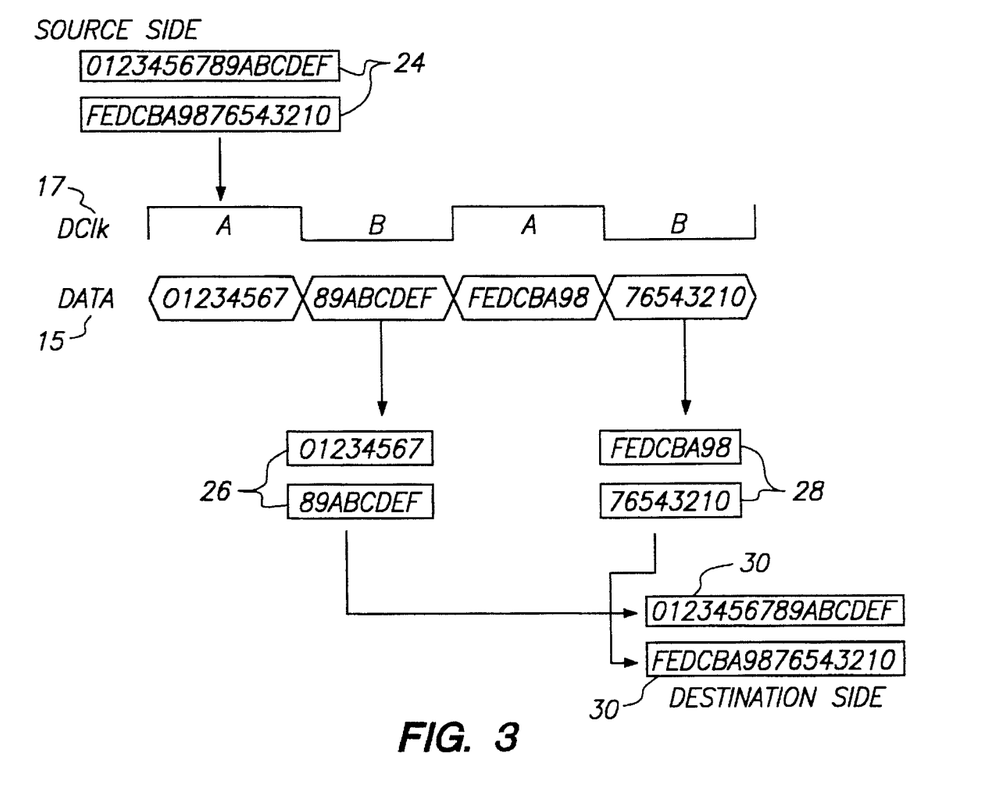
FIG. 3 is a simplified diagram showing data transfer for a representative data packet.

In FIG. 3, 32-bit data transfer, provided preferably as tightly-coupled parallel pairs, between source 24 and destination 30 for a representative 64-bit data packet is shown. Thus, the first 32 bits of 64-bit source packet 24 are latched during the first half (i.e., off the falling edge) of the period of DClk 17, and the second 32 bits of source packet 24 is then latched during the second half (i.e., off the rising edge) of the period of DClk 17. Then, both 32-bit data streams 26 are concatenated to re-generate the 64 bit data packet at the destination side 30. This concatenation technique is repeated as shown for subsequent 32-bit data stream 28.

Figure 4:
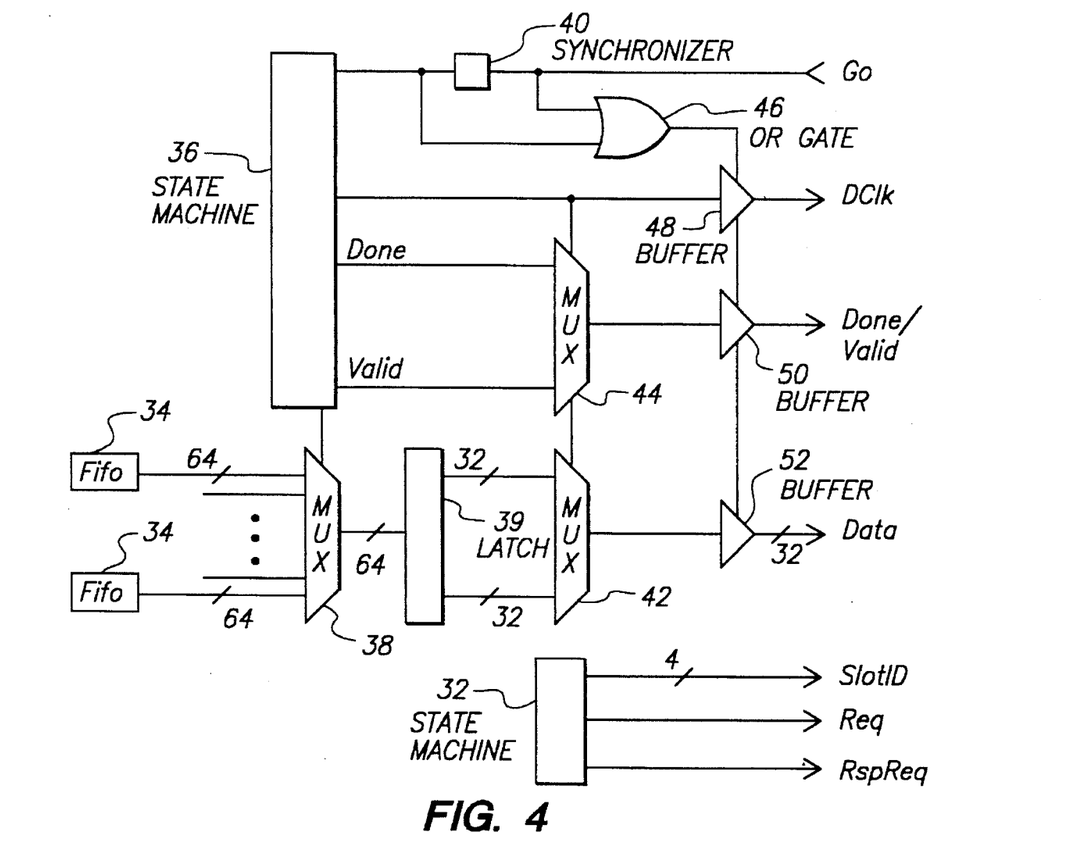
FIG. 4 is a schematic diagram showing a master portion of the system of FIG. 1.

In FIG. 4, a schematic diagram of a generalized master side interface is shown, particularly having two or more master packet first-in/first-out (FIFO) devices 34, having arbitrary depth, each device 34 preferably providing eight words of 64 bits, and coupled initially to multiplexer 38 and latch 39 to latch 64-bit data packets and then generate therefrom 32-bit data streams, according to the data transfer technique described above, which are received by multiplexer 42, as toggled by DClk 17, and then output enabled 52 by Go signal to provide data signal.

State machine 32 controls assertion of Slot ID, Req and RespReq signals. When Go signal is received, other state machine 36, synchronizer 40, and OR-gate 46, as configured, retrieve data from one of FIFO devices 34 through multiplexer 38 and latch 39 (which preferably generates high and low 32-bit data portions from 64-bit data) and assert Valid and Done signals. Go signal is tied to the output enables/buffers 52, of the data lines for generating synchronously bus data 15 and DClk 17, as shown in further detail in the schematic diagram of the master side interface in FIG. 5, which preferably is implemented in each node 14, 16(1–n).

Figure 5:
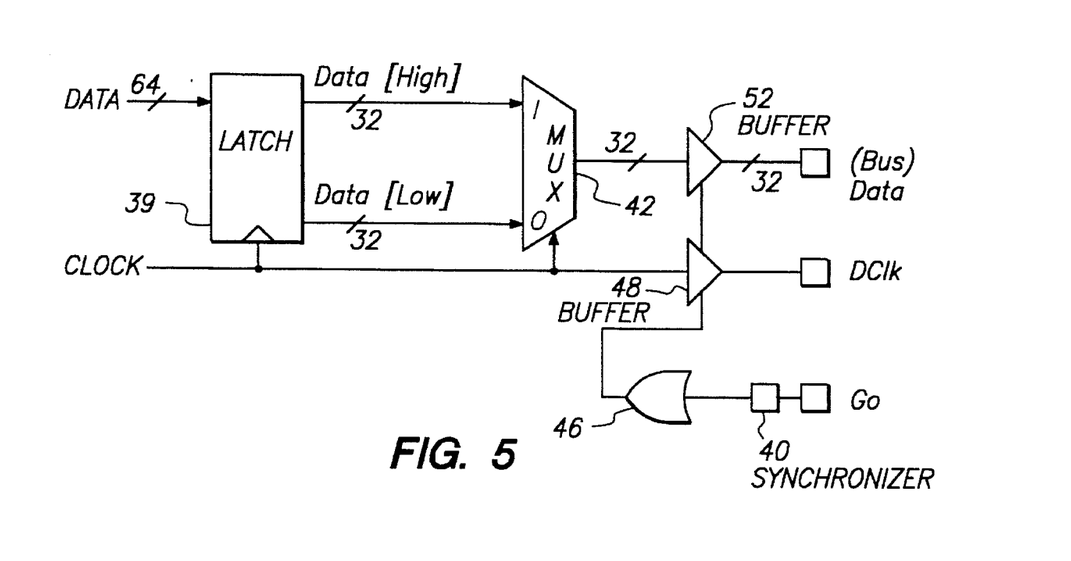
FIG. 5 is a more detailed schematic diagram of the master portion of FIG. 4.

Go signal is also used to asynchronously tri-state and synchronously enable the DClk and Done/Valid signals, which pass through multiplexer 44 and then output enable circuit/buffer 50. Thus, as shown in FIG. 5, a new 64-bit data line is presented to latch 39 on each DClk cycle, such that clocking is applied to 2-to-1 multiplexer 42 to provide 32-bit half of the 64-bit data line on each half clock period or tick of DClk (i.e., two ticks per period). Further, as used herein, the term "line" refers to a unit of data transferred in two ticks or a period of the source's driven data clock (e.g., a 64-bit line).

Figure 6:
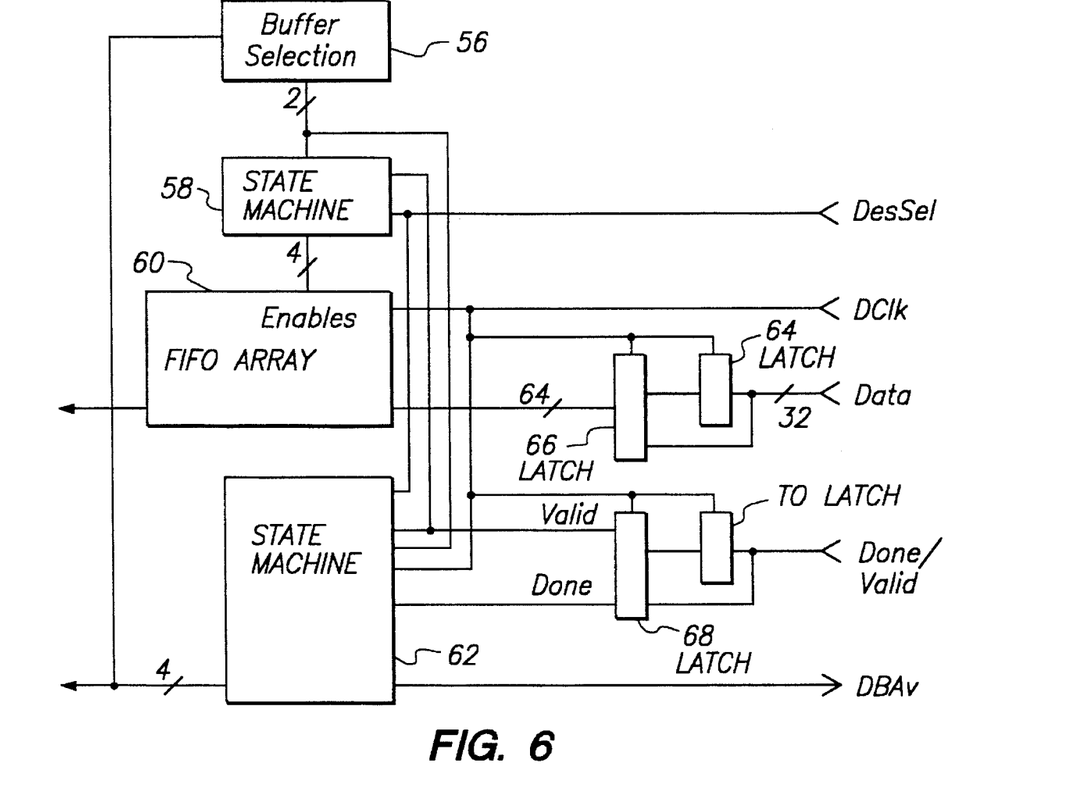
FIG. 6 is a schematic diagram showing a slave portion of the system of FIG. 1.

In FIG. 6, a schematic diagram of a generalized slave side interface is shown, particularly having FIFO array 60 which includes multiple buffers, preferably four 64-bit wide and eight words deep, for receiving data 15 through latch circuitry 64, 66. When DesSel signal indicates that this slave node is the destination of a packet transfer, state machine 58 is caused to load reassembled data packet lines into FIFO array 60. In this way, state machines 58, 62, 56 may determine which buffer included in FIFO array 60 is to be loaded, monitor Done and Valid signals through latch circuitry 70, 68 to determine transfer end, notify the node of new valid packet arrival, and synchronize the data packet to local clock. Note that as generated for bus 19 transmission, such data packet is inherently synchronous to DClk 17.

Figure 7:
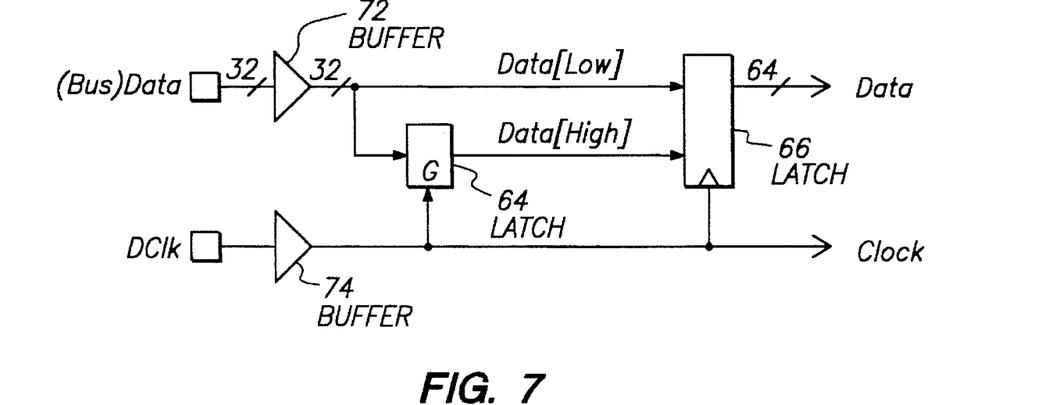
FIG. 7 is a more detailed schematic diagram of the slave portion of FIG. 6.

In particular, as shown in further detail in the schematic diagram of FIG. 7, the slave side data path, which preferably is implemented in each node 14, 16(1–n), enables concatenation of two 32-bit tick data portions into a single 64-bit line. Latch 64 is open during the first tick and closes at the falling edge of DClk, at the start of the second tick, thereby retaining the first 32 bit portion of the data packet. Buffers 72, 74 are input buffers for Data and DClk signals in the slave side interface.

At the rising edge of DClk, at the end of the second tick, the 32 bits on the bus are concatenated with the stored first tick data to form a full 64 bit line that is stored in the line register on the current rising DClk edge. Preferably, an extra DClk cycle is required during transfer to clear the final line from the line register.

Figure 8:
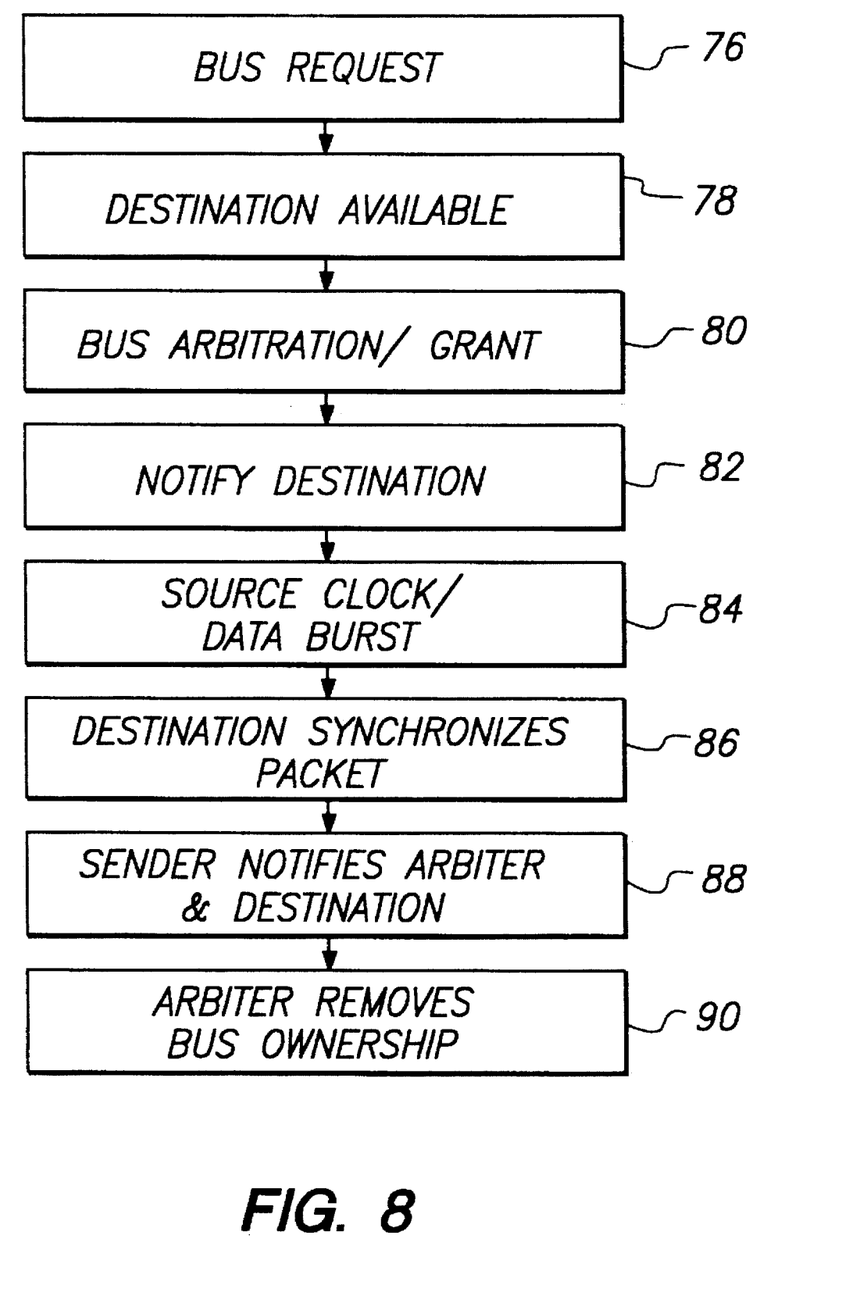
FIG. 8 is a process flow diagram of the invention.

In FIG. 8, a simplified flow chart summarizes steps according to the present invention. Initially, possible master node 14, 16(1–n) makes a request (Req signal) 76 of arbiter circuit 10 to send data packet signal 19 to possible slave destination, as specified with SlotID signal. When the destination indicates (DBAv signal) that it can accept data 78, then bus arbitration 80 occurs.

Eventually, bus 19 is granted 80 (Go signal) to the requester, and the destination is notified (DesSel signal) 82 that a packet is forthcoming. The source supplies a transfer clock (DClk signal 17) and burst the packet to the destination 84. Preferably, data are transmitted in packets having a minimum size of eight bytes for each data word through the bus at a minimum rate of fifty megahertz. The destination synchronizes the packet after the entire packet is received completely to prepare it for local consumption 86. At the end of the packet burst, the sender indicates (Done/Valid signal) 88 to its destination and arbiter 10 that it has completed its transfer. Similarly, deassertion of Req signal informs arbiter circuit 10 of packet transfer completion, which removes 90 ownership of bus 19.

Figure 9:
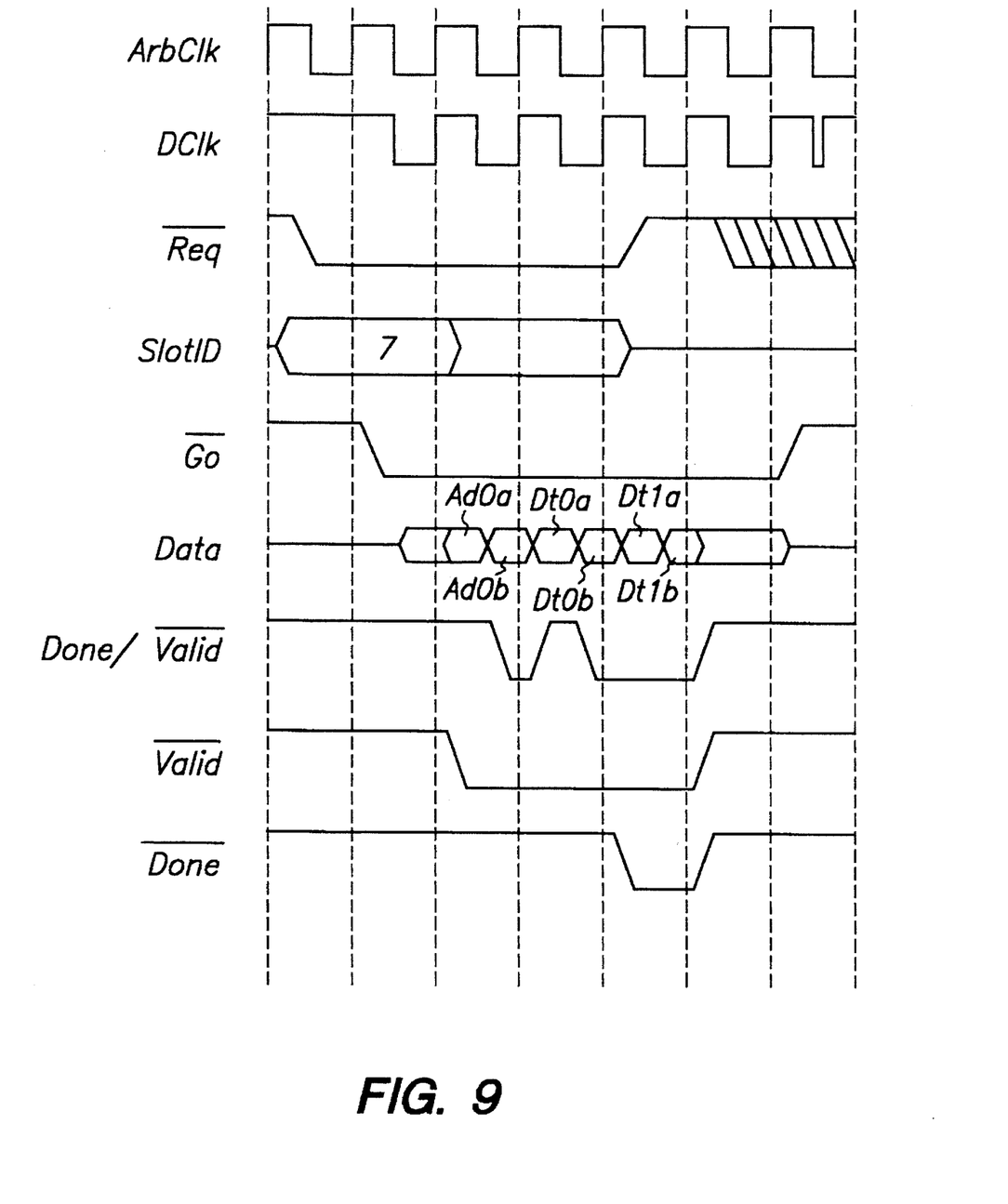
FIG. 9 is a timing diagram for a representative write operation by the master portion of FIG. 4.

In FIG. 9, a timing diagram is provided to show a representative master packet transfer or write transaction to slot #7, as designated by SlotID signal. After Req signal is asserted initially, Go signal is granted to the requesting node to indicate that the destination node has asserted DBAv signal to indicate an available buffer. After a complete clock cycle at the destination, DBAv signal may be deasserted. After Go signal is asserted, SlotID lines may also be deasserted.

Further, after Go signal is asserted, the master node drives its local clock (e.g., ArbClk or other periodic signal) onto the DClk line. One tick is left idle to allow DClk signal 17 and data lines 15 to settle and then the header is driven along with Valid signal. Two data ticks follow, with Done signal being asserted on the final data tick. One final tick is used to drive Valid and Done signals inactive and allow the destination to clear its buffer. Req signal is also deasserted during this tick, allowing Go signal to be deasserted after the following tick and ending the transfer. Done and Valid signals may be actually be multiplexed as a single signal line.

Figure 10:
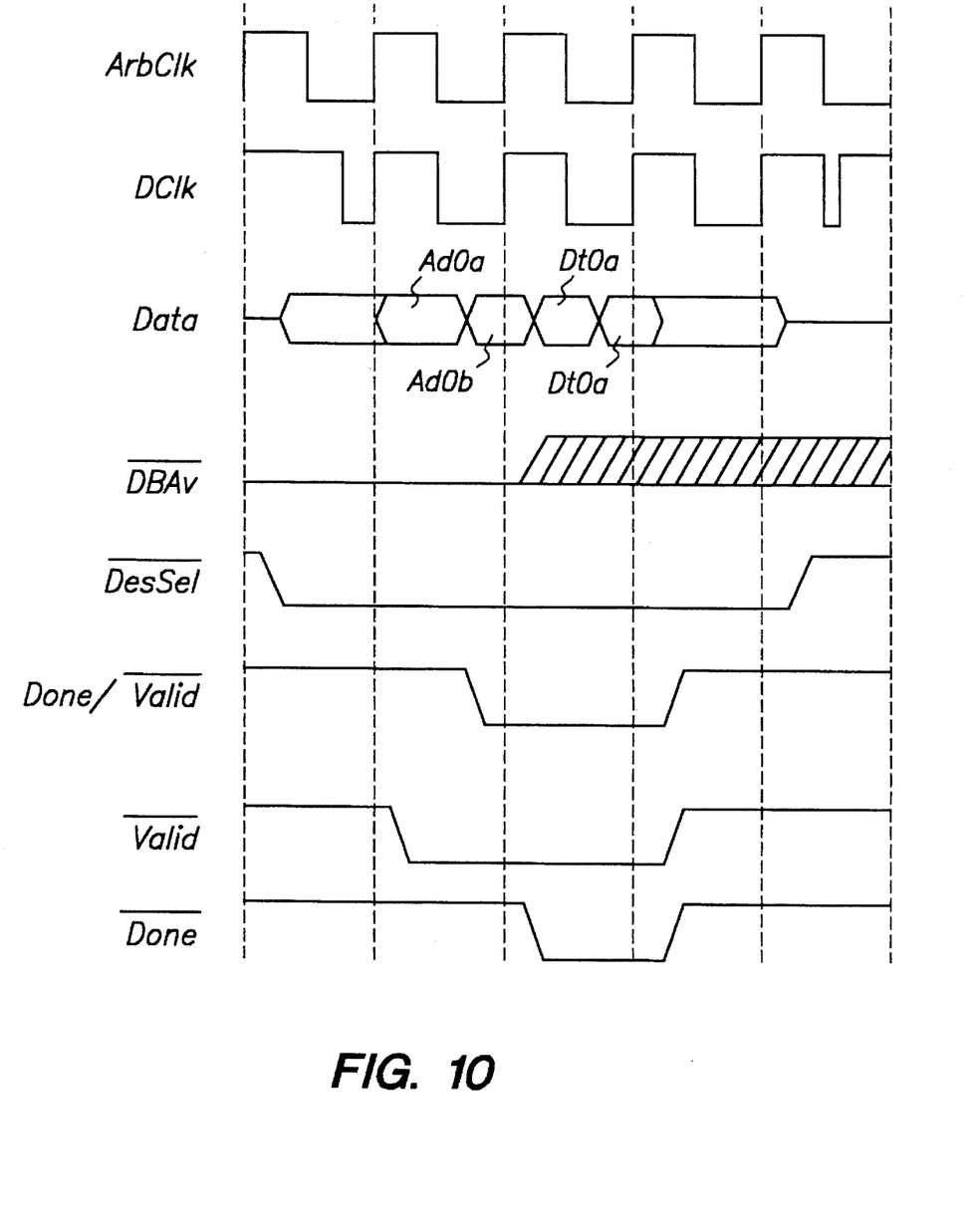
FIG. 10 is a timing diagram for a representative write operation by the slave portion of FIG. 6.

In FIG. 10, a timing diagram is provided to show a representative slave packet transfer or write transaction. Here, the destination node receives DesSel signal at the same time the source node receives Go signal. During normal write (non-read response), DBAv signal must have been active for the bus grant to have been given. After the first tick with Valid signal, DBAv signal status is updated.

After destination is selected with DesSel signal and time is allowed for DClk 17 and data lines 15 to settle, Valid signal is asserted and the packet header is transferred. Following the header, data associated with packet are sent. During final data tick, Done signal is asserted to indicate final data piece sent. Note that one full DClk tick occurs after final data tick to allow destination node to clear line buffer and update internal state.

Figure 11:
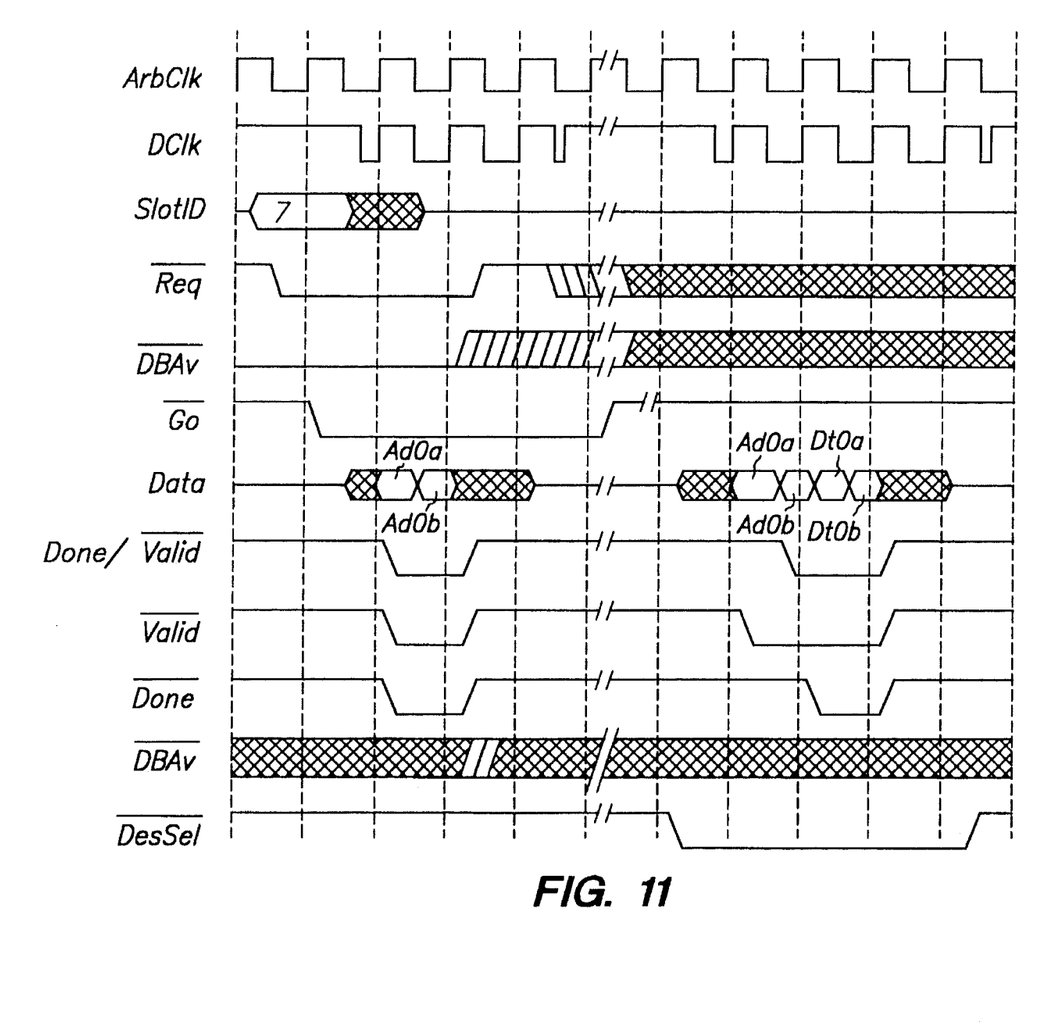
FIG. 11 is a timing diagram for a representative read operation by the master portion of FIG. 4.

In FIG. 11, a timing diagram is provided to show a representative master packet read transaction, which includes a master read request and then subsequently a slave read response. In this way, the master read request follows the same format as a master write, although the header indicates a read transaction and no data is transferred with the request. Later, the requested data is returned to the original requester just as in normal slave write transfer, except that the value of DBAv signal is not checked before sending the response. Preferably, it is assumed that the requested has a buffer reserved for response.

DBAv signal at the master may already be deasserted when the read packet is launched, as in the case where the master has a slave buffer permanently reserved only for read responses. If, however, the launch of the read request and the allocation of a slave buffer for its response requires DBAv signal to become deasserted, it must transition after the first cycle containing Valid signal.

Figure 12:
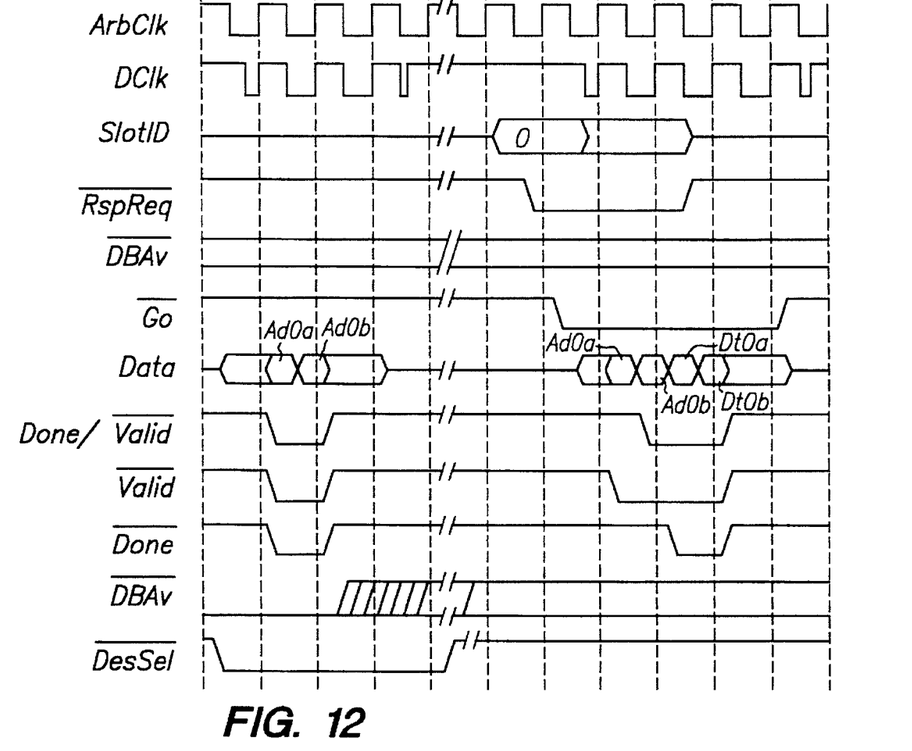
FIG. 12 is a timing diagram for a representative read operation by the slave portion of FIG. 6.

In FIG. 12, a timing diagram is provided to show a representative slave packet read transaction, which includes a slave read request, followed later by a master read response. When a node is sending a read response packet, it uses RespReq signal to arbitrate for the bus rather than Req signal. This is done to avoid deadlocks; Req signal requires that DBAv signal at the destination indicate that a buffer is available, while RespReq does not check DBAv signal as the requester must have a buffer available for the response.

Figure 13:
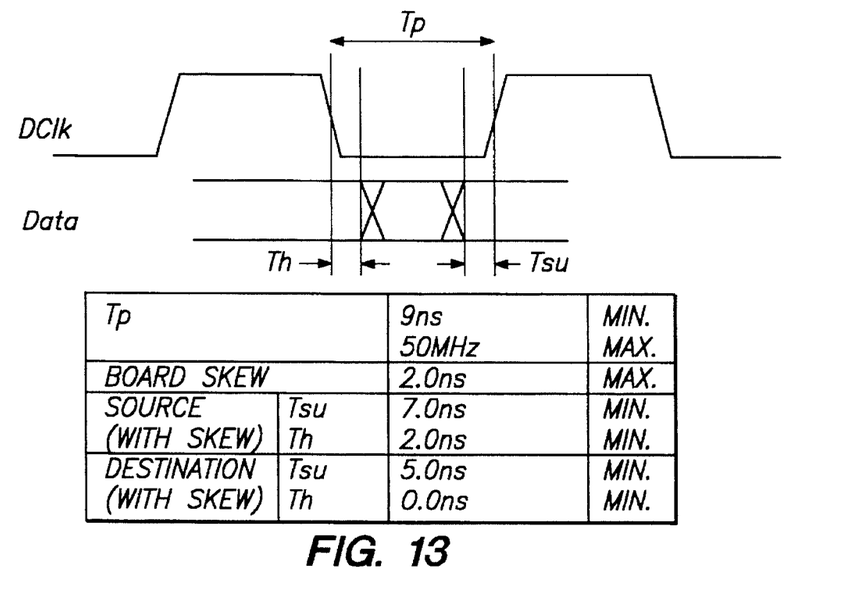
FIG. 13 is a timing diagram and specifications for data and clock signals of the system in FIG. 1.
Figure 14:
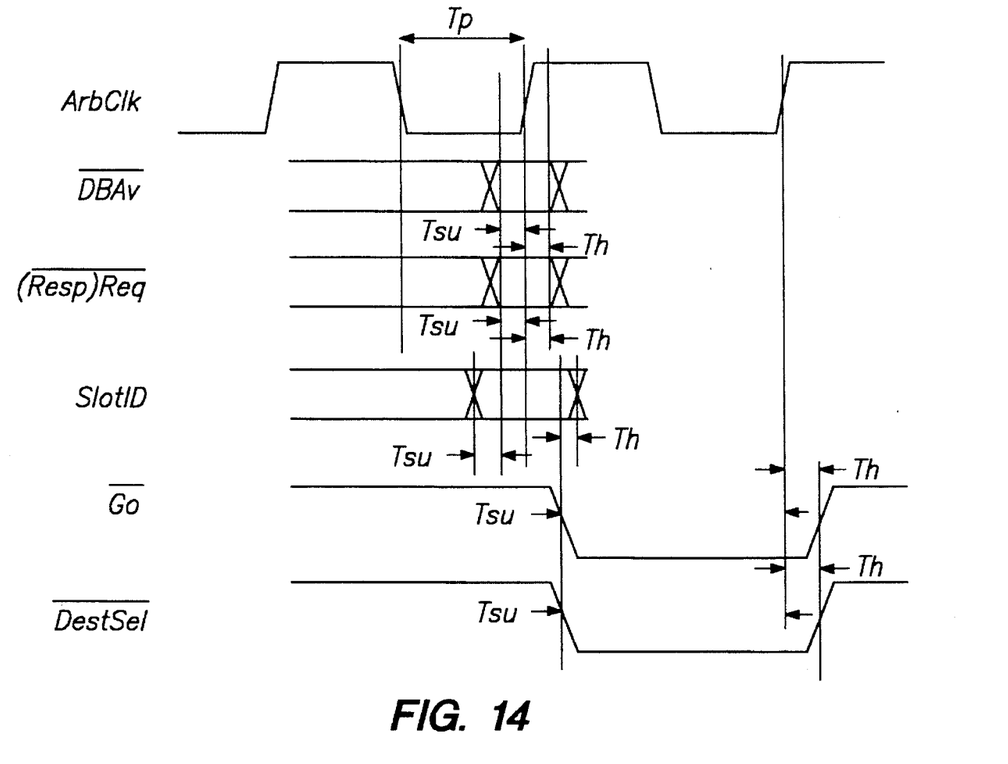
FIG. 14 is a timing diagram for arbitration signals of the system in FIG. 1.
Figure 15:
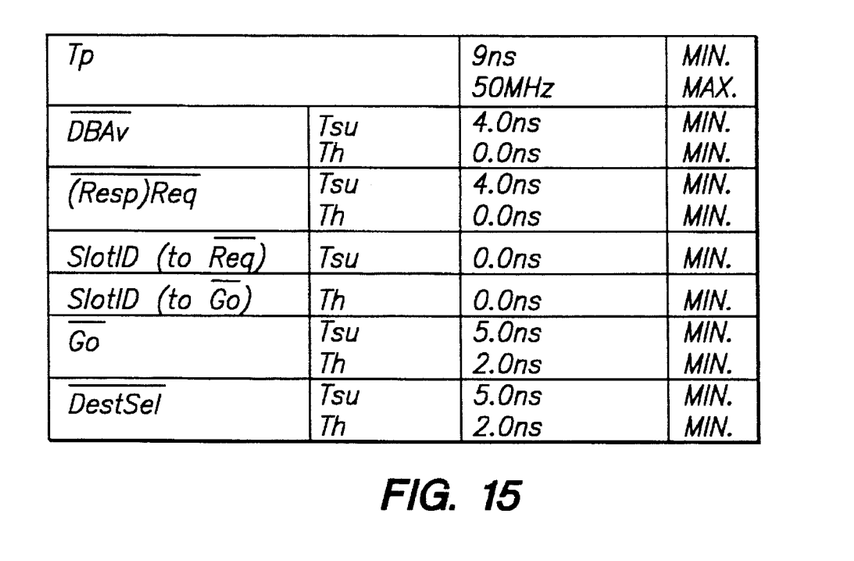
FIG. 15 is a table of timing specifications for arbitration signals of the system in FIG. 1.

FIG. 13 provides timing diagrams and specifications for data and clock signals 15, 17 in accordance with the preferred embodiment. Additionally, FIG. 14 provides timing diagrams, and FIG. 15 provides timing specifications of arbitration signals in accordance with the preferred embodiment. While such preferred timing values are specified for a current embodiment having a "maximum" clock frequency of 50 Mhz, it is contemplated that substantially higher clock frequencies (e.g., over 1 Ghz) are possible in accordance with the present invention.

We claim:

1. In a bus system comprising a central arbiter and a plurality of nodes coupled to a bus, a data communication process comprising the steps of:

arbitrating among the plurality of nodes by the central arbiter synchronously with an arbitration clock signal to provide bus access to a first node of the plurality of nodes coupled to the bus;

transferring by the first node a data packet through the bus to a second node of the plurality of nodes coupled to the bus according to a data clock signal generated by the first node independently from the arbitration clock signal; and transferring by the first node to the second node a done signal according to the data clock signal.

2. The process of claim 1 wherein the transferring step comprises transferring the data packet and the data clock signal generated by the first node through the bus to the second node, such that the second node reads the data packet synchronously according to the data clock signal.

3. The process of claim 2 wherein the data packet and the data clock signal are transmitted synchronously by the first node to the bus.

4. The process of claim 1 wherein the data packet is transferred at a minimum size of eight bytes for each data word transferred through the bus at a minimum rate of fifty megahertz.

5. The process of claim 1 wherein the arbitrating step further comprises:

generating a node identification signal by the first node to identify the second node; and providing bus access to the first node responsive to the second node being available.

6. The process of claim 5 wherein the providing step further comprises:

querying the second node to determine its availability;

receiving a node availability signal generated by the second node responsive to the querying step; and granting control of the bus to the first node.

7. The process of claim 6 wherein the second node generates the node availability signal when the second node has at least one storage device available for receiving the data packet at a specified data transfer rate and size.

8. The process of claim 1 wherein the data packet is transferred through the bus as two concatenated data subpackets, a first data subpacket being transferred during a first portion of a period of the data clock signal; and a second data subpacket being transferred during a second portion of the period of the data clock signal.

9. The process of claim 1 wherein the first node comprises a motherboard, and the second node comprises an expansion card.

10. In a signal communication system comprising a plurality of components coupled through a common set of plural signal lines, a method for signaling between components, the method comprising the steps of:

generating a first signal synchronously with a first clock signal by a first component of the plurality of components identifying a second component;

generating by the second component a second signal synchronously with the first clock signal indicating availability of a buffer in the second component capable of receiving the data signal at a specified data rate;

transmitting a data signal from the first component through the common set to a second component coupled to the common set synchronously with a second clock signal generated separately from the first clock signal, wherein the second component receives the data signal synchronously with the second clock signal.

11. The method of claim 10 wherein the determining step further comprises:

generating a first signal by the first component identifying the second component; and generating by the second component a second signal indicating availability of a buffer in the second component capable of receiving the data signal at a specified data rate.

12. The method of claim 10 wherein the data signal is provided as first and second data sub-signals which are transmitted through the common set during a common period of the second clock signal.

13. A bus arbitration system for coupling signals among a plurality of components, the bus arbitration system comprising:

a bus;

a plurality of slots, each slot being coupled between the bus and one of the plurality of components;

an arbitration clock for providing an arbitration clock signal;

a bus arbiter coupled to the slots and to the arbitration clock for granting the bus synchronously with the arbitration clock signal to a one of the plurality of slots coupled to the bus; and a data clock coupled to the component that is coupled to the one of the plurality of slots granted the bus for providing a data clock signal to transmit a data packet and done signal to another of the plurality of components synchronously with the data clock signal, the data clock signal being, generated asynchronously with the arbitration clock signal.

* * * * *